R. E. HELLMUND.
CONTROL SYSTEM FOR ALTERNATING CURRENT MOTORS.
APPLICATION FILED NOV. 29, 1915.

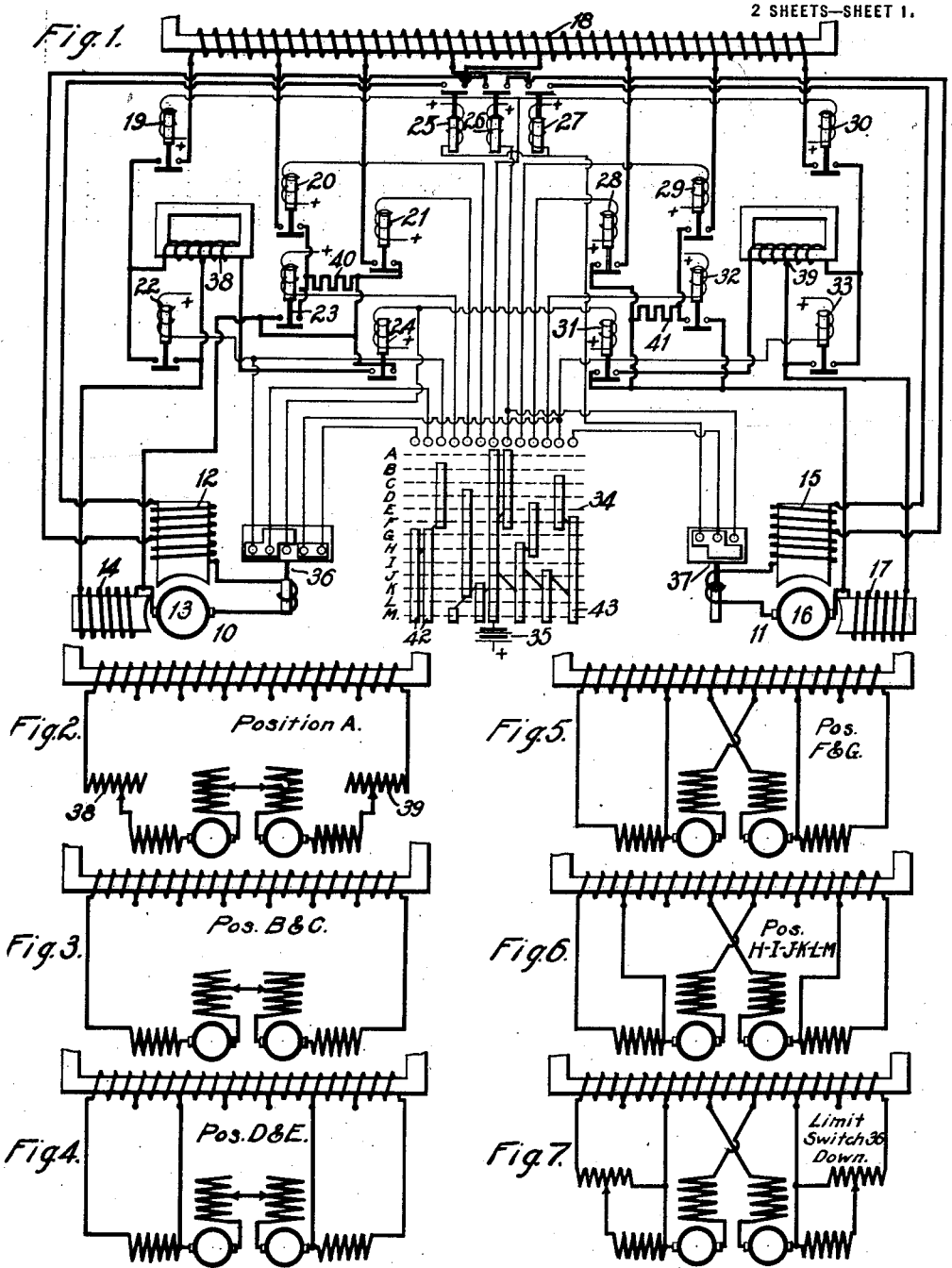

1,251,660.

Patented Jan. 1, 1918.
2 SHEETS—SHEET 2.

WITNESSES:
A. J. Fitzgerald
D. C. Davis.

INVENTOR
Rudolf E. Hellmund.
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM FOR ALTERNATING-CURRENT MOTORS.

1,251,660.   Specification of Letters Patent.   Patented Jan. 1, 1918.

Application filed November 29, 1915. Serial No. 63,974.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Control Systems for Alternating-Current Motors, of which the following is a specification.

My invention relates to control systems for alternating-current motors of the commutator type, and it has for its object to provide means whereby motors of the character indicated may be accelerated and otherwise controlled in a smooth and uniform manner and with substantially sparkless commutation.

Figure 8:
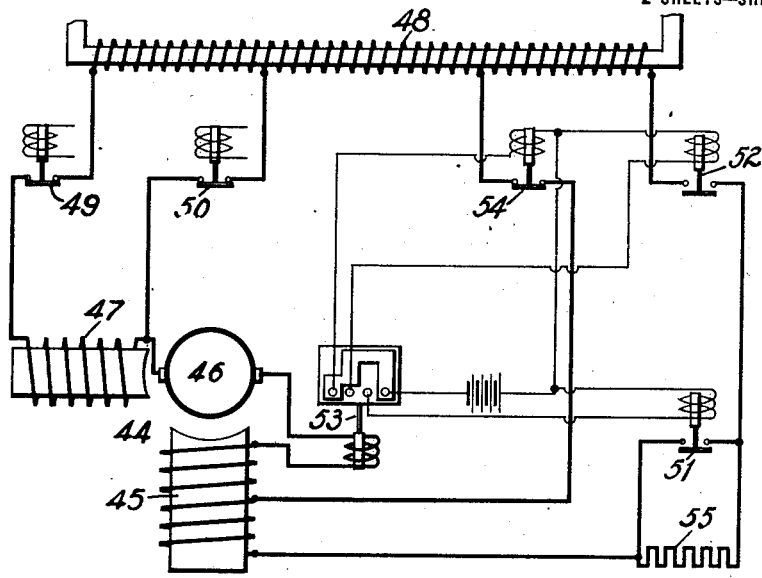
Figure 9:
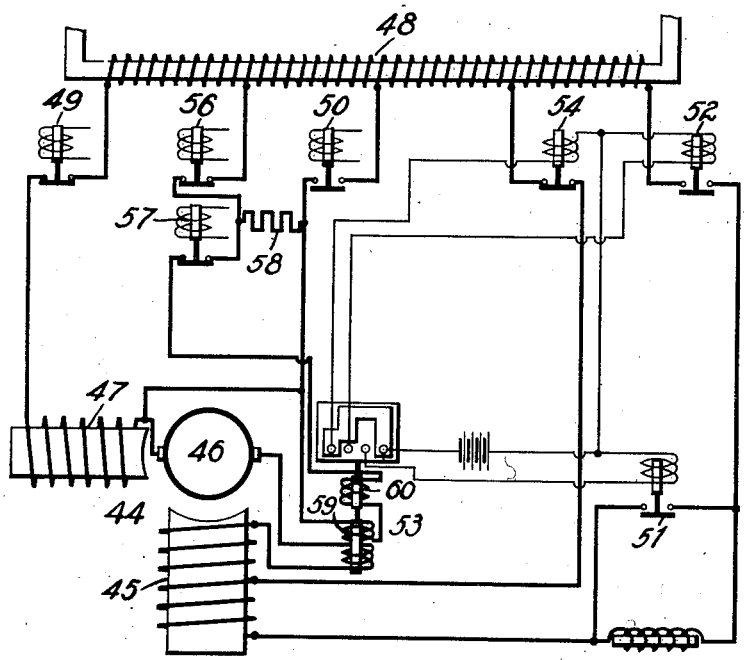

In the accompanying drawing, Figure 1 is a diagrammatic view of a plurality of alternating-current motors of the compensated, commutator type, together with their attendant supply and control circuits, embodying a preferred form of my invention; Figs. 2 to 7, inclusive, are simplified diagrammatic views, illustrating the development of the connections in the system of Fig. 1; and Figs. 8 and 9 are diagrammatic views of modifications of the system shown in Fig. 1.

In my copending application, Serial No. 63,973, filed contemporaneously herewith, I have disclosed a method of operation for alternating-current motors of the commutator type whereby, if the load current exceeds a predetermined amount during high-speed operation, the main field is automatically weakened by eliminating a portion of the main field turns from the main current path. It necessarily follows that weakening of the main field causes an increase in the motor speed and, where the operating conditions are such as to demand an accurate control of motor speed, it is necessary to provide means whereby, in a system of the character indicated, the applied voltage may be reduced when the main field is weakened and vice versa.

By the present invention, I provide means whereby said function may be performed a simple and effective manner and, furthermore, I provide means whereby the voltage impressed upon the different portions of a motor may be suitably adjusted to provide uniform acceleration, with proper control not only of speed but also of torque and of sparking.

Referring to the accompanying drawing for a more detailed understanding of my invention, I show two alternating-current motors of the compensated, commutator type at 10 and 11 in Fig. 1. The motor 10 is provided with a main field winding 12, an armature 13 and a cross field winding 14. In like manner, the motor 11 is provided with a main field winding 15, an armature 16 and a cross field winding 17. Current for the operation of the motors 10 and 11 may be derived from any suitable alternating-current source, such, for example, as the secondary winding 18 of a transformer. The operation of the motors 10 and 11 from the source 18 is subject to the control of suitable switches 19 to 33, inclusive, which, in turn, are subject to operation by a controller 34 of any suitable type. Operating current for the switches 19 to 33, inclusive, is derived from a battery 35, and, for the sake of clearness, I have omitted the common return wire from all the actuating windings of said switches to the lower pole of said battery.

In addition to the said control switches, I provide current relays 36 and 37, the function of the low current relay 36 being to weaken the cross-field excitation in the motors 10 and 11 when the load current falls below a predetermined amount during high-speed operation, and the function of the high current relay 37 being to weaken the main field excitation and to simultaneously increase the applied motor voltage when the load current exceeds a certain predetermined amount at high-speed operation.

Having thus described the general arrangement of a control system embodying my invention, the operation is as follows: The movement of the controller 34 to the position A closes the switches 19, 26 and 30 and establishes the circuit shown in Fig. 2, the two motors being connected in series relation through the switch 26, whereby a portion of the main field windings is eliminated, and the motor voltage being reduced by including portions of auxiliary transformer windings 38 and 39 as impedance devices.

The movement of the controller 34 to the positions B and C closes the switches 22 and 23, eliminating the devices 38 and 39 and establishing the circuit shown in Fig. 3.

The ordinary doubly-fed connection is next established in the positions D and E by closing the switches 21 and 28, as indicated in Fig. 4. The main-field excitation and also the main-motor voltages are increased in the positions F and G by opening the switch 26 and closing the switches 25 and 27, whereby the interconnection of the main field windings is severed and the outer terminal of each winding is connected to a point in the source beyond the center thereof, with respect to the individual motors, all as indicated in Fig. 5.

The last six accelerating positions are consumed in moving the doubly-fed taps outwardly by the proper manipulation of the switches 20, 21, 23, 28, 29 and 32 and by preventive devices 40 and 41, all in a well known manner, decreasing the cross field excitation and increasing the excitation of the working windings in the two motors.

In order to provide for the automatic weakening of the cross field excitation when the working current falls below a predetermined amount during the last seven accelerating positions, the actuating current for the switches 22 and 33 during said positions is derived from a special contact member 42 in the controller 34 through the control board of the low current relay 36. When, therefore, during said accelerating positions, the line current falls below the setting of the relay 36, the control board of the latter falls, whereupon the switches 22 and 33 are opened and the switches 24 and 31 are closed, connecting the primary windings of the auto-transformers 38 and 39 across the voltage source previously connected across the main field windings and energizing said cross field windings by reduced voltage derived from the secondary turns of said auxiliary transformers, all as indicated in Fig. 7.

In order to weaken the main fields and simultaneously decrease the motor voltage upon the flow of excessive load current during the last seven accelerating positions, the current for the energization of the switches 25 and 27, derived from the contact member 43 in the controller 34, is led through the control board of the line switch 37 which is unaffected by normal load current. Upon the occurrence of a line current in excess of the setting of the high-current relay 37, said switch rises, opening the switches 25 and 27 and closing the switch 26, establishing the main-field connection illustrated in Figs. 2, 3 and 4 and producing the desired change both in main-field strength and in the motor voltage.

In Fig. 8, I show a simple method for decreasing the main-field strength and for simultaneously reducing the motor voltage applied to a single alternating-current motor. A motor 44, provided with a main field winding 45, an armature 46 and a cross field winding 47, derives current from a source 48 in the usual manner, the outer cross field terminal being energized through a switch 49, the doubly-fed connection through a switch 50 and the main field terminal through switches 51 and 52 by any suitable controller. A high-current relay 53 is inserted in the motor circuit and is arranged to be operated when, as shown, the motor current exceeds a predetermined amount, an intermediate point in the main field winding 45 being connected to an intermediate point in the source 28 through a switch 54, thus producing the desired simultaneous reduction in the main field strength and in the motor voltage. Upon the cessation of said excessive load current, the control board of the relay 53 falls, first closing the switch 52 permitting current flow to the entire field winding through a preventive device 55, then opening said switch 54 and finally closing the switch 51 to reestablish the normal motor connection.

It is frequently desirable to provide an automatic main-field adjustment of the character indicated that shall have different operating values during different portions of the accelerating operations. I illustrate a system of said character in Fig. 9 wherein a motor 44, similar to that shown in Fig. 8, is provided with means for first closing the doubly-fed connection through a switch 50 and subsequently shifting said doubly-fed connection to the left through the manipulation of switches 56 and 57, and of a preventive device 58 to obtain higher speeds by decreasing the cross-field voltage and increasing the voltage applied to the working windings. It is desirable to provide an automatic main-field strength-adjusting device operated by the armature current until the circuit is closed through said last described doubly-fed connection and to thereafter place the control of said automatic main-field adjusting device under the control of the current in said doubly-fed connection. Such object might be obtained by the use of two separate line switches, but, as shown, I place two windings 59 and 60 on the line switch 53 and connected in said doubly-fed connection. The winding 59 is so located as to neutralize the action of the normal armature-current winding, and the control of the line switch then passes solely to the solenoid 60, the subsequent operation of the switch 53 being identical with that described in Fig. 8.

While I have described my invention in its preferred forms, it will be obvious to those skilled in the art that it is susceptible of various minor changes and modifications without departing from the spirit thereof, and I desire, therefore, that only such limitations shall be placed thereupon as are imposed by the prior art or are specifically set forth in the appended claims.

I claim as my invention:

1. The combination with an alternating-current motor of the commutator type, of a source of alternating current, means for adjusting the speed of said motor by altering the connections thereof to said source, and means for automatically weakening the main field of said motor when the load current exceeds a predetermined amount and for simultaneously reducing the motor voltage.

2. The combination with an alternating-current motor of the commutator type, of a source of alternating current, means for adjusting the speed of said motor by altering the connections thereof to said source, and means for automatically weakening the main field of said motor when the load current exceeds a predetermined amount and for simultaneously reducing the motor voltage to such an amount as to counteract the tendency of said field weakening to accelerate the motor.

3. The combination with a source of alternating current having a mid point, of two alternating-current motors of the commutator type connected in series relation across said source, said motors having main field windings, means for interconnecting points in said main field windings, and alternative means for connecting said main field windings to separate points beyond the mid point of said source in such manner that the field connections overlap and the sum of the voltages applied to said motors is greater than the total voltage of said source.

4. The combination with a source of alternating current having a mid point, of two alternating-current motors of the commutator type connected in series relation across said source, said motors having main field windings, means for interconnecting points in said main field windings, alternative means for connecting said main field windings to separate points on opposite sides of the mid point of said source in such manner that the field connections overlap and the sum of the voltages applied to said motors is greater than the total voltage of said source, and automatic means for shifting from said over-lapping field connection to said interconnected field connection when the load current exceeds a predetermined amount.

5. The combination with a source of alternating current, of two alternating-current motors of the commutator type, means for connecting said motors in series across said source for low-speed operation and for connecting each motor across more than half of said source for high-speed operation, and automatic means for reverting from the latter connection to the former connection if the load current exceeds certain predetermined amounts during high-speed operation.

6. The combination with a source of alternating current, of two alternating-current motors of the commutator type having main field windings, means for connecting said motors in series across said source with intermediate points in the main field windings interconnected for low-speed operation, and for connecting each motor, including all of the main field windings, across more than half of said source for high-speed operation, and automatic means for reverting from said latter connection to said former connection if the load current exceeds certain predetermined amounts during high-speed operation.

7. The combination with a source of alternating current, of an alternating-current motor of the compensated, commutator type having cross field windings connected to said source, an auxiliary transformer, means for connecting a portion of said transformer as a choke coil to reduce the motor voltage during low-speed operation, and automatic means for connecting said transformer to reduce the voltage supplied to the cross field winding if the load current falls below a predetermined minimum value during high-speed operation.

In testimony whereof, I have hereunto subscribed my name this 22nd day of Nov. 1915.

RUDOLF E. HELLMUND.